Nov. 5, 1946.  E. F. HUDDLE  2,410,501
ENSILAGE BLOWER
Filed March 22, 1944  3 Sheets-Sheet 1

Inventor:
Edwin F. Huddle,
By Paul O. Pippel
Attorney.

Nov. 5, 1946.  E. F. HUDDLE  2,410,501
ENSILAGE BLOWER
Filed March 22, 1944  3 Sheets-Sheet 2

Nov. 5, 1946.   E. F. HUDDLE   2,410,501
ENSILAGE BLOWER
Filed March 22, 1944   3 Sheets-Sheet 3

Inventor:
Edwin F. Huddle,
By Paul O. Pippel
Attorney.

Patented Nov. 5, 1946

2,410,501

UNITED STATES PATENT OFFICE 2,410,501

ENSILAGE BLOWER

Edwin F. Huddle, Elmwood Park, Ill., assignor to International Harvester Company, a corporation of New Jersey Application March 22, 1944, Serial No. 527,663

4 Claims. (Cl. 302—37)

This invention relates to a new and improved ensilage blower and has for one of its principal objects the provision of means for feeding ensilage to a blower.

Heretofore, ensilage blowers have usually employed some type of feed conveyer positioned at right angles to a plane described by the path of a blower fan. The particular conveyer employed was generally of the auger or worm type. It is, therefore, an important object of the present invention to employ a feed conveyer which lies parallel to the path of blower fan travel.

Another important object of this invention is to provide a novel feed device for ensilage blowers which tends to prevent congestion of the ensilage as it is fed into a blower.

Another and still further important object of this invention is to provide a leveling auger for ensilage blowers cooperating with a regular feed conveyer in order that the amount of ensilage fed to the blower remains substantially constant regardless of the amount of ensilage thrown into the feed hopper.

Other and further important objects of the present invention will become apparent from the disclosures in the following specification and accompanying drawings, in which.

As shown in the drawings.

Figure 1:
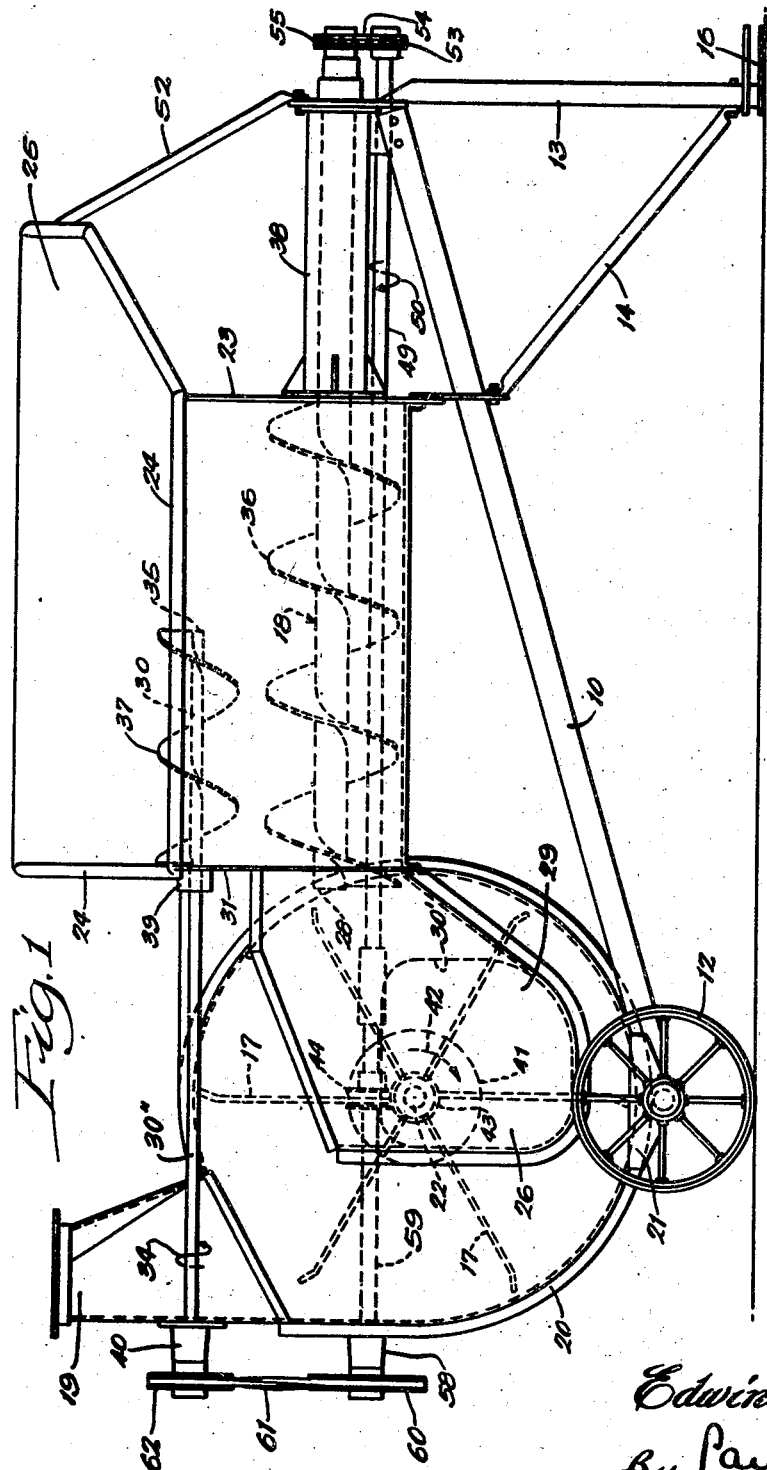
Figure 1 is a side elevation of the ensilage blower of this invention.

The reference numeral 10 indicates generally a chassis or frame work on which is mounted the ensilage blower of this invention. The frame 10 is supported at its rear end by a wheel truck 11, having a pair of wheels 12 at its forward end and by a leg 13 at its rear end. The leg 13 gives stability to the support of the ensilage blower. The leg 13 is reinforced by the link 14. A foot or clevis 16 is provided at the lower end of the leg 13 and when it is desired to transport the ensilage blower, the clevis 16 acts as the hitch or attaching member to the draw-bar of a tractor or other draft vehicle.

The ensilage blower consists of a fan 17 and a feeding means. The feeding means includes an auger 18 for carrying ensilage to the fan whereupon it is blown upwardly through the nozzle 19 and by means of pipe (not shown) is fed to the top of a silo or other storage receptacle. The fan 17 is positioned within a housing 20 which is supported directly on the wheel truck 11 as shown at 21.

As previously stated, ensilage has formerly been fed to the blower fan 17 by a conveyor traveling in axial alinement with the fan axis shaft 22. In the instant ensilage blower, the feed auger 18 lies parallel to a plane described by the path of travel of the fan 17. Or, in other words, the auger 18 is at right angles to the fan shaft 22.

Figure 2:
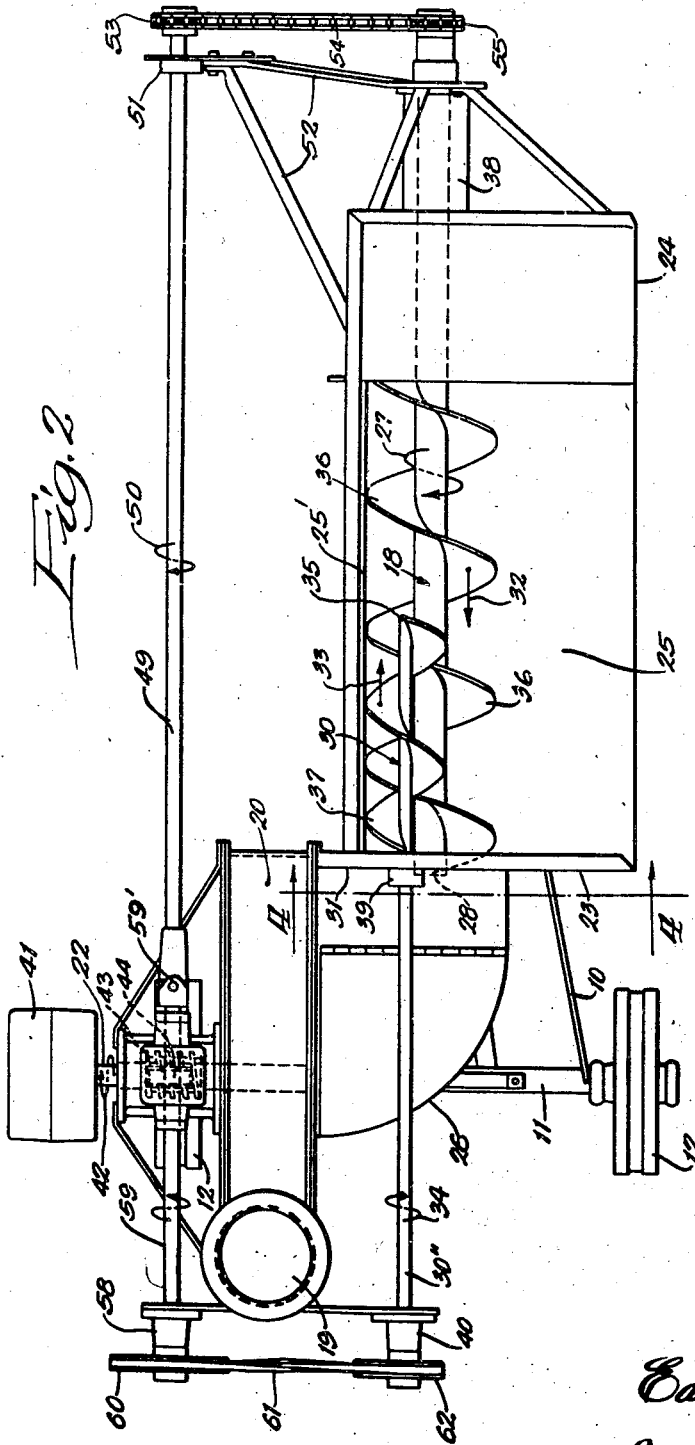
Figure 2 is a top plan view of the ensilage blower as shown in Figure 1.
Figure 3:
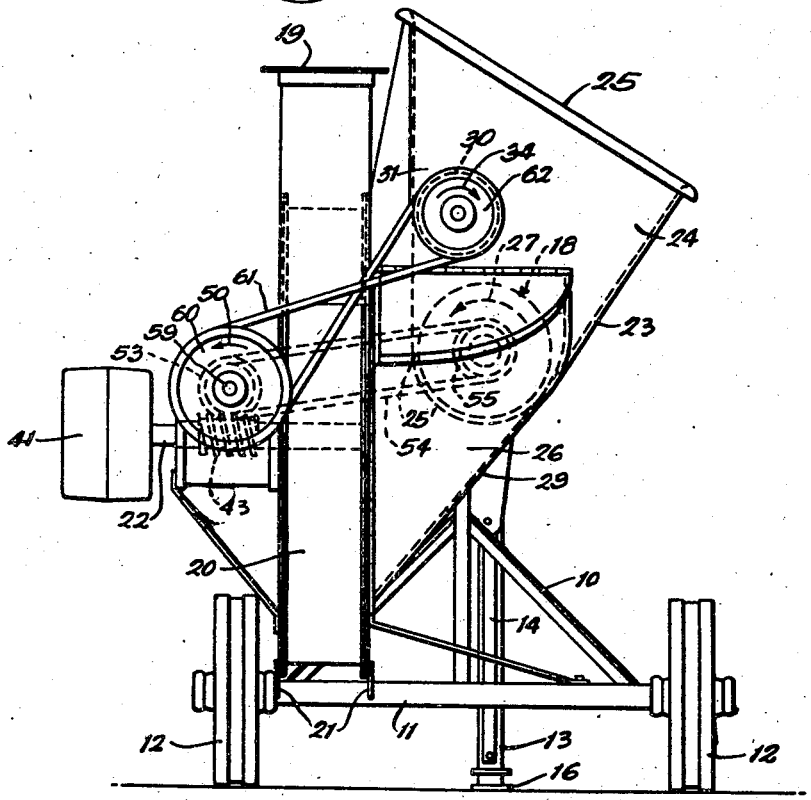
Figure 3 is an end view of the ensilage harvester as shown in Figures 1 and 2.
Figure 4:
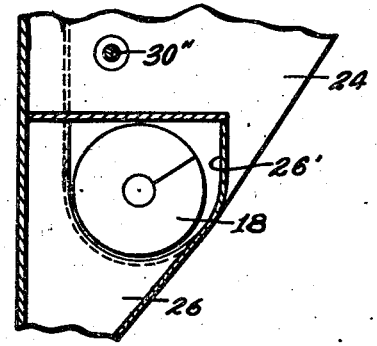
Figure 4 is a sectional view taken on the line 4—4 of Figure 2.

The auger 18 is mounted within a housing 23, the upper portion of which is expanded to form a hopper 24 which has a large opening 25. A cut-off bar 25' extends the length of the hopper and is placed closely adjacent the peripheral edges of the flight 37 of the auger 18. This cut-off contributes to the successful feeding of the auger. The housing 23 is joined to the fan housing 20 by means of an elbow-like conduit 26 which is best shown in Figure 2.

In operation, ensilage is put into the hopper 24 through its large opening 25 whereupon the auger 18, rotating in the direction indicated by the arrow 27, carries the ensilage to the end of the housing 23, whereupon the non-journaled or the open end 28 of the auger 18 drops the ensilage into the conduit 26 where it falls by gravity and suction created by the fan 17 down the inclined outer wall 29 of this elbow-like conduit 26 and thence into the fan housing 20 through the opening 30'. The ensilage is then picked up by the fan 17, rotating in a clockwise direction as viewing the device in Figure 1, and thrown upwardly through the nozzle 19. The open end 28 of the auger 18 means that the auger is unsupported at its discharge end and permits continuous forcing of ensilage through that end without any obstruction. It has been found from experience that in filling the hopper 24 relatively uniformly and with the auger constantly carrying ensilage to its opened end, shown at 28, that that end of the hopper becomes heaped high with ensilage, whereupon the air supply for the fan 17 is cut off. The fan depends upon receiving a supply of air from the hopper opening 25 and if that is completely clogged with ensilage the effect of the fan 17 in throwing the ensilage or hay will be nil.

In order to effect a remedy for this congestion of ensilage at the feed end of the auger, an auxiliary auger 30 is positioned above the main feed auger 18 and projects outwardly from the end 31 of the hopper 24. The augers 18 and 30 are adapted to feed in exactly opposite directions as indicated by the arrows 32 and 33. The direction of rotation of the smaller auxiliary auger 30 is indicated by the arrow 34. The auxiliary auger 30 has an open end 35 at a point substantially midway between the end walls of the hopper 24. It will now be seen that any portion of ensilage that is thrown in near the end 31 of the hopper 24 will be forcefully conveyed to the middle area of the hopper 24 by the auxiliary auger 30, whereupon it will be permitted to drop into the flight 36 of the main feed auger 18 whence it is carried beneath the auxiliary auger 30 and fed to the conduit 26. Inasmuch as the opening 26' into the conduit 26 is substantially the same size as the auger 18, it will easily receive all the ensilage that the auger may carry without becoming unduly congested and will also permit intake of air to the fan. The auxiliary auger 30 with its spiral flight 37 travels above and closely adjacent the flight 36 of the auger 18 so that any surplus ensilage at the end of the hopper 24 is carried out to the middle area of the hopper 24. The auxiliary auger 30 acts as a shear or wiping device for the main feed auger 18, and thereby limits the amount of ensilage which can be discharged to the opened end 28 of the auger 18.

The auger 18 is journally supported in a substantially long bearing 38 to compensate for the non-supported open end 28. The small auxiliary open end auger 30 is journally supported in bearings 39 and 40.

Any suitable source of power may be employed in operating the fan 17 and the open end augers 18 and 30. As shown in the drawings, the power is secured from a tractor power take-off through a pulley 41. The pulley 41 is adapted to directly drive the fan shaft 22. The direction of rotation of the pulley 41 and the shaft 22 is indicated by the arrow 42. A worm 43 is keyed or otherwise fastened to the shaft 22 and, as shown in Fig. 2, is in continuous driving relation with a worm gear 44 which is fastened to a shaft 59. The use of a worm and gear supplies the necessary proportionate reduction in the speed of rotation of the augers with respect to fan speed. The shaft 49 is journally supported in a bearing 51 at one end. The bearing 51 is held in position by means of strut members 52 mounted rigidly with respect to the frame 10, housing 23 and unitary hopper 24. A sprocket 53 is keyed to one end of the driving shaft 49 and imparts movement to the chain 54 wrapped therearound. The other end of the chain 54 surrounds a sprocket 55 keyed or otherwise fastened to an extension of the auger shaft 18. The auger 18 will, therefore, rotate in the direction indicated by the arrow 27.

A V-belt pulley 60 is mounted on the other end of the drive shaft 59 journaled at one end in a bearing 58 and at its other end it joins the shaft 49 by a universal joint 59'. A crossed V-belt 61 between the V-belt pulleys 60 and 62 imparts drive from pulley 60 to pulley 62. This pulley 62 is fastened to a shaft 30'' of the auxiliary auger 30 and is given rotation, the direction of which is indicated by the arrow 34. The fan 17, of course, will be driven in a clockwise direction as viewed in Figure 1 and as shown by the arrow 42.

It will be apparent that herein is provided a novel and efficiently operating ensilage blower which automatically levels the ensilage in a feed hopper and prevents congestion of the ensilage being fed to the fan and resultant machine failures which ordinarily accompany an ensilage blower. The intention, therefore, is to limit the invention only within the scope of the appended claims.

What is claimed is:

1. An ensilage feeder comprising an elongated hopper, a main auger positioned in and extending the entire length of the bottom of said hopper and adapted to feed material longitudinally thereof and having one end unjournaled, said hopper having a discharge opening at one end thereof adjacent the unjournaled end of the auger whereby ensilage carried by the auger will exit through the discharge opening, and a second auxiliary auger above the main auger having an unjournaled end terminating substantially centrally of the main auger and adapted to feed material in an opposite direction, whereby excess ensilage in the upper portion of the hopper is carried by the auxiliary auger away from the discharge opening and then permitted to drop to a lower level in the hopper and is then carried toward the discharge opening by the main auger, thereby preventing congestion at the discharge opening.

2. An ensilage blower including a pair of parallel housings, a transverse conduit intermediate of and adjoining said housings at the end of one of the housings and centrally of the other of said housings for passage of ensilage from one housing to the other, a hopper for the one housing, an auger journaled for rotation on a longitudinal axis within the one housing, said auger having an unjournaled end terminating adjacent the transverse conduit, a fan journaled for rotation in the other of said housings in a path parallel to said longitudinal auger axis, and means in the one housing for carrying excess ensilage from the transverse conduit to the center of the housing, whereby ensilage is transmitted from the one housing to the other without congestion.

3. An ensilage blower including a pair of parallel housings, a transverse conduit adjoining an end of one of said housings and the approximate center of the other of said housings for communication of material from one housing to the other, a hopper for one of said housings, an auger journaled for rotation within the one housing, said auger having an unjournaled end terminating adjacent the transverse conduit and adapted to feed ensilage to said transverse conduit, an auxiliary auger journaled for rotation above the first-named auger and extending from a point adjacent the transverse conduit to an unjournaled end thereof terminating intermediate the ends of the first auger and adapted to feed excess ensilage in a direction opposite to said first-named auger, and a fan journaled for rotation in the other of said housings in a path parallel to the first-named auger in the one housing, whereby ensilage is transmitted from the one housing to the other without congestion.

4. An ensilage blower including a pair of parallel housings, a transverse conduit adjoining said housings for passage of ensilage from one housing to the other, a hopper for one of said housings, an auger journaled for rotation within said one housing, said auger having an unjournaled end terminating adjacent the transverse conduit for feeding ensilage thereto, an auxiliary auger journaled for rotation above the first-auger and extending from a point adjacent the transverse conduit to an unjournaled end thereof terminating intermediate the ends of the first auger, means for rotating and causing said augers to feed in opposite directions, and a fan journaled for rotation in the other of said housings, whereby ensilage is transmitted from the one housing to the other housing without congestion.

EDWIN F. HUDDLE.